US012252244B2

(12) United States Patent
Badalassi

(10) Patent No.: US 12,252,244 B2
(45) Date of Patent: Mar. 18, 2025

(54) VERTICAL TAKE OFF AND LANDING FLYING MACHINE

(71) Applicant: VB HI-TECH VENTURES LIMITED, London (GB)

(72) Inventor: Vittorio Badalassi, Poole (GB)

(73) Assignee: Vittorio Badalassi, London (GB)

( * ) Notice: Subject to any disclaimer, the term of this patent is extended or adjusted under 35 U.S.C. 154(b) by 210 days.

(21) Appl. No.: 16/964,754

(22) PCT Filed: Jan. 22, 2019

(86) PCT No.: PCT/GB2019/050162
§ 371 (c)(1),
(2) Date: Jul. 24, 2020

(87) PCT Pub. No.: WO2019/145694
PCT Pub. Date: Aug. 1, 2019

(65) Prior Publication Data
US 2020/0354054 A1    Nov. 12, 2020

(30) Foreign Application Priority Data
Jan. 24, 2018    (GB) ...................... 1801192

(51) Int. Cl.
*B64C 29/02*    (2006.01)
*B64C 27/32*    (2006.01)
(Continued)

(52) U.S. Cl.
CPC .............. *B64C 29/02* (2013.01); *B64C 27/32* (2013.01); *B64C 39/026* (2013.01); *B64C 27/20* (2013.01)

(58) Field of Classification Search
CPC ..... B64C 39/026; B64C 29/02; B64C 11/001; B64C 11/48
See application file for complete search history.

(56) References Cited

U.S. PATENT DOCUMENTS 2,936,973 A    5/1960    Kappus
2,953,321 A    9/1960    Robertson et al.
(Continued)

FOREIGN PATENT DOCUMENTS

CA    2902931 A1    3/2017
DE    3842897 A1    3/1990
(Continued)

OTHER PUBLICATIONS

International Search Report; European Patent Office; International Application No. PCT/GB2019/050162; Mar. 28, 2019; 4 pages.
(Continued)

*Primary Examiner* — Nicholas McFall
*Assistant Examiner* — Terri L Filosi
(74) *Attorney, Agent, or Firm* — Taft Stettinius & Hollister LLP

(57) ABSTRACT

A vertical take-off and landing (VTOL) flying machine. The machine includes a ducted fan having an intake side and an outlet side, at least two co-axial rotors configured to contra-rotate about a fan axis X when driven in rotation; a primary drive source arranged substantially co-axially with the ducted fan and to the outlet side of the ducted fan; and first and second thrust air ducts configured to split thrust from the ducted fan into a pair of thrust streams and to guide the two respective thrust streams to opposite respective sides of the primary drive source, the ducts being rotatable to direct motion of the machine. A number of configurations of secondary drive sources and alternative thrust sources are provided for improved safety.

24 Claims, 3 Drawing Sheets

(51) Int. Cl.
*B64C 39/02* (2023.01)
*B64C 27/20* (2023.01)

(56) References Cited

U.S. PATENT DOCUMENTS

| | | | |
|---|---|---|---|
| 3,023,980 | A | 3/1962 | Martin et al. |
| 3,138,350 | A | 6/1964 | Lovett, Jr. |
| 3,379,366 | A | 4/1968 | Garnier |
| 3,381,917 | A | 5/1968 | Moore et al. |
| 5,295,643 | A | 3/1994 | Ebbert et al. |
| 5,779,188 | A | 7/1998 | Frick |
| 6,450,445 | B1 | 9/2002 | Moller |
| 7,465,201 | B1 | 12/2008 | Thivierge et al. |
| 2003/0052222 | A1* | 3/2003 | Plump .................. B64C 39/062 244/23 A |
| 2003/0098388 | A1 | 5/2003 | Walmsley |
| 2004/0061022 | A1* | 4/2004 | Paul ...................... B64C 11/001 244/10 |
| 2004/0061023 | A1 | 4/2004 | Lau |
| 2006/0032971 | A1* | 2/2006 | Baldwin ................. B64C 29/02 244/66 |
| 2006/0231677 | A1* | 10/2006 | Zimet ..................... B64C 27/10 244/17.23 |
| 2007/0290097 | A1 | 12/2007 | Ishiba |
| 2009/0235641 | A1 | 9/2009 | Brown |
| 2009/0304504 | A1 | 12/2009 | Ishiba |
| 2010/0012766 | A1 | 1/2010 | Moore |
| 2011/0163199 | A1 | 7/2011 | Cardozo |
| 2011/0226891 | A1* | 9/2011 | Tran ...................... B64D 25/10 244/122 A |
| 2012/0259528 | A1* | 10/2012 | Minto ...................... F02C 9/20 701/100 |
| 2012/0298790 | A1 | 11/2012 | Bitar |
| 2014/0103165 | A1 | 4/2014 | Zapata |
| 2015/0344134 | A1* | 12/2015 | Cruz Ayoroa ........ B64C 39/024 244/48 |
| 2016/0023527 | A1 | 1/2016 | Dietrich |
| 2016/0152333 | A1 | 6/2016 | Simon et al. |
| 2016/0311529 | A1 | 10/2016 | Brotherton-Ratcliffe et al. |
| 2016/0311544 | A1 | 10/2016 | Phan et al. |
| 2016/0340035 | A1 | 11/2016 | Duru |
| 2017/0057650 | A1 | 3/2017 | Walter-Robinson |
| 2017/0225573 | A1* | 8/2017 | Waltner .................. B60L 50/16 |

FOREIGN PATENT DOCUMENTS

| | | | |
|---|---|---|---|
| DE | 102011082719 A1 * | 3/2013 | ............. B64C 27/08 |
| ES | 1144741 U | 10/2015 | |
| ES | 1144743 U | 10/2015 | |
| FR | 1584267 A | 12/1969 | |
| GB | 1093720 A | 12/1967 | |
| GB | 2365392 A | 2/2002 | |
| GB | 2468787 A | 9/2010 | |
| RU | 2004129256 A | 3/2006 | |
| WO | 2006093420 A1 | 9/2006 | |
| WO | 2009157780 A1 | 12/2009 | |
| WO | 2009157781 A1 | 12/2009 | |
| WO | 2011002309 A1 | 1/2011 | |
| WO | 2011002517 A2 | 1/2011 | |
| WO | 2011010249 A1 | 1/2011 | |
| WO | 2014191934 A2 | 12/2014 | |
| WO | 2015000088 A1 | 1/2015 | |
| WO | 2017105266 A1 | 6/2017 | |

OTHER PUBLICATIONS

Written Opinion of the International Search Authority; European Patent Office; International Application No. PCT/GB2019/050162; Mar. 28, 2019; 9 pages.

Great Britain Search Report Under Section 17(5); Intellectual Property Office of Great Britain; Patent Application No. GB1801192.4; Jul. 23, 2018; 3 pages.

Raj Patel et al.; Design and Development of Low Speed 4-Stage Axial Contra-Rotating Demonstrator Compressor; ResearchGate; Aug. 2014; 8 pages.

Cengiz Camci et al.; Double Ducted Fan (DDF); Penn State; Sep. 3, 2010; 70 pages.

Roland Berger Ltd; Think:Act—Aircraft Electrical Propulsion—The Next Chapter of Aviation?; Sep. 2017; 32 pages.

* cited by examiner

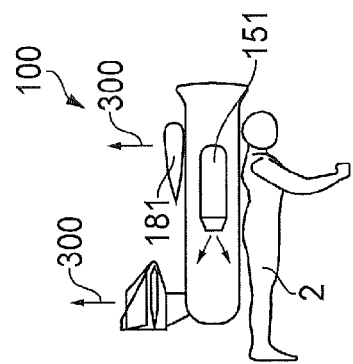
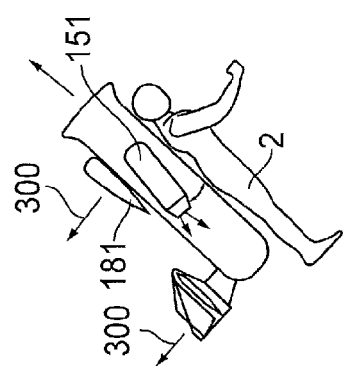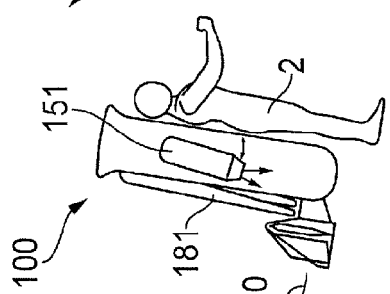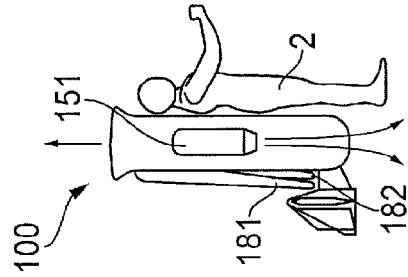

VERTICAL TAKE OFF AND LANDING FLYING MACHINE

CROSS REFERENCE TO RELATED APPLICATIONS

This application is a U.S. national stage filing of International Patent Application No. PCT/GB2019/050162 filed Jan. 22, 2019, which claims priority to Great Britain Application No. 1801192.4 filed Jan. 24, 2018, the contents of each application hereby incorporated by reference in their entirety.

FIELD OF THE INVENTION

The present invention relates to vertical take-off and landing devices. In particular, the invention relates to personal vertical take-off and landing devices and improvements to the efficiency and safety thereof.

BACKGROUND

A number of different vertical take-off and landing (VTOL) Flying Machines have been trialled and demonstrated over time. Challenges encountered with such machines have ranged from difficulties in consistent flight control, to low fuel efficiency, very high noise, and the dangers of such devices in the event of power loss, in particular at too low an altitude for the parachutes to be effective as safety devices for the machine or its passenger or payload.

Commercially known devices are those such as the EHANG 184 passenger device, which has a configuration similar to well-known consumer drones, in which a plurality of propellers are held in a vertical configuration at four corners of the vehicle. A similar type of vehicle is marketed under the name "Surefly" by Workhorse Group Inc. Also known is the Martin Jetpack, which comprises a pair of ducted fans driven by an internal combustion engine. None of these known devices have had a commercial success since their drawbacks overcome the benefits and there is room for improvement in such vertical take-off and landing devices.

Various problems can arise with the current solutions available on the market. They can be expensive, bulky, of limited safety, with a low range, and a short time between overhaul (TBO) and extremely noisy. Current vertical take-off systems for payloads over around 100 kg include small helicopters and bulky or with very limited range vertical take-off and landing (VTOL) devices and UAVs (Unmanned Aerial Vehicles). Improvements in efficiency of operation, usability and noise generation are desirable. Further, a fundamental concern with known VTOL devices is one of safety. Open rotors/propellers can disintegrate when accidentally being in contact with even very light and/or fragile obstacles, while a power system failure at less than around 150 m altitude does not allow any parachute device sufficient time to deploy and stall the descent of the device and its pilot. This can represent a significant risk of death or serious injury. Secondly, vertical take-off and landing is generally a very noisy activity, in particular if combustion engines are used to power the VTOL device. Further, ranges for VTOL devices and UAVs can be insufficient for some uses, examples include a maximum of around 20 km, declared for the current product marketed under the name "Martin Jet-Pack". Also, hovering flight is notoriously fuel inefficient and it requires the use of very high performance engines (very high power to weight ratio) resulting in a very short time between overhaul (TBO). This regular overhaul of the motor is a significant time and cost overhead in the running of the device and reduces its usability. As a consequence, no suitable VTOL device for carrying a payload in the region of 60 to 150 kilos (approximate weight of an average adult human) has been developed with any commercial success or flexibility of application. In general, devices of this kind created to date have been custom made and dedicated to particular roles or flight envelopes.

SUMMARY OF THE INVENTION

The invention proposes improvements to personal vertical take-off and landing (VTOL) devices by combining a number of elements in a novel way. Key features of the novel device include the following. A ducted contra-rotating fan set typically along with the necessary gearbox to create the contra rotating motion, is used as a source of thrust and discharges to two separate nozzle exhausts. Such a fan is torque neutral, very efficient, very safe and silent since the rotor blades are encased and very compact in size. An engine for driving the contra rotating fan, and the related drive train are positioned in between the two exhaust nozzles generally below the fan. Such a configuration, combined with a compact fan results in a very small and lightweight machine in comparison to the current state of the art. One or more cooling radiator(s) for the engine and/or other drive source (such as an electric motor) can be located inside the thrust path in the fan or in the exhaust ducts extending from the fan, taking advantage of the high air flow for increased efficiency. The device incorporates vertical take-off and landing and also can include foldable wings which can be deployed after take-off for horizontal flight for improved efficiency (speed, fuel economy and TBO—time before overhaul) and range. A further beneficial preferred feature is the use of one or more back-up thrust systems for use in either an emergency when the primary drive source has failed and/or as a quieter secondary source of drive for the thrust generating fan of the device, which can be used during take-off and landing. Such backup thrust systems can also contribute to improved fuel economy and TBO. The invention provides a vertical take-off and landing, VTOL, flying machine, comprising any or all of the following features:

a ducted fan for providing thrust for flight, take-off and landing, the ducted fan having an intake side and an outlet side and preferably comprising at least two co-axial rotors configured to contra-rotate about a fan axis X when driven in rotation;

a primary drive source configured to drive the ducted fan in rotation, the primary drive source being arranged substantially co-axially with the ducted fan and to the outlet side of the ducted fan;

first and second thrust air ducts configured to split thrust from the ducted fan into a pair of thrust streams and to guide the two respective thrust streams to opposite respective sides of the primary drive source.

The first and second thrust air ducts are preferably rotatable relative to the main body of the device and the axis of rotation of the ducted fan to direct thrust to control motion of the device.

The device may comprise one or more variable inlet guide vanes located at an inlet side of the ducted fan.

The machine may further comprise a gearbox located between a) at least one of the primary drive source and secondary drive source; and b) the ducted fan. The gearbox may be configured to provide contra-rotating output drives for the contra-rotating fans from the output of the primary and/or secondary drive source.

The VTOL flying machine may further comprise a secondary drive source configured to provide a secondary drive to the ducted fan. The secondary drive source may be provided with energy from a secondary energy store. The secondary energy store may be configured to receive and store energy from the primary drive source. The secondary drive source and its secondary energy store may be sized and configured to provide between 40 seconds and seven minutes, preferably between 75 seconds and 5 minutes or 100 seconds and 4 minutes of powered hovering flight to the machine, preferably by driving the ducted fan, in the absence of power from the primary drive source.

The primary drive source may be connected to the ducted fan via a selectively engageable drive transfer means configured to selectively transfer or isolate drive from the primary drive source to the ducted fan. The means may comprise a clutch.

The VTOL flying machine may comprise a primary energy store for providing energy to the primary drive source, and a secondary energy store for providing energy to the secondary drive source. The primary drive source may be an internal combustion engine and the primary energy store may optionally be a source of combustion fuel. The primary drive source may be an electrical machine and the primary energy store may be an electrical energy storage device. The primary energy store may be a battery or a capacitor-based electrical storage device.

The secondary drive source may be an electrical machine and the secondary energy store may be an electrical energy storage device. The electrical energy storage device may be a battery for storing electrical energy delivered to it or a capacitor-based electrical storage device.

The secondary drive source may comprise a kinetic energy storage device, configured to store kinetic energy delivered to it from the primary drive source, and to deliver the stored kinetic energy to the ducted fan upon demand.

The secondary energy store may be configured to have a deliverable energy storage capacity of between 1% to 12%, preferably between 2% to 10% or 3% to 8%, of the energy storage capacity of the primary energy store. Deliverable energy storage capacity is intended to refer to the amount of energy from the energy storage that is deliverable to the fan shaft, taking into account mechanical and thermal losses between the primary and/or secondary energy storage and the fan shaft, which reduces the total useful energy available. Therefore, where the overall efficiency of the powertrain from the energy storage to the fan shaft is e.g. X % due to conversion losses, the deliverable energy storage capacity may be X % of the overall storage capacity of the energy store.

The secondary drive source may be configured to be operable both independently of the primary drive source to drive the ducted fan, and in combination with the primary drive source to provide drive to the ducted fan from both primary and secondary drive sources.

The VTOL flying machine may further comprise an alternative, or secondary, thrust source independent of the ducted fan, the alternative thrust source being operable to provide powered hovering flight to the machine in the absence of thrust being provided by the ducted fan. The alternative thrust source may comprise a rocket or rocket motor, preferably a solid fuel rocket motor.

The machine may be configured to be operable to conduct an emergency landing using the secondary drive source in the event of a failure of the primary drive source. The device may be configured to be operable to conduct an emergency landing using the alternative thrust source in the event of an absence of thrust from the fan.

The VTOL flying machine may further comprise one or more cooling devices, for cooling the primary and/or secondary drive sources, the cooling device(s) being located at least partially within the ducted fan or the first or second ducts.

The VTOL flying machine may further comprise an air intake for delivering intake air to the primary drive source, the air intake located either outside the machine (possibly using an air scoop) or within one of the first or second thrust air ducts.

The VTOL flying machine may further comprise at least one deployable wing configured to be moved from a stowed position to a deployed position to allow the VTOL flying machine to transition from a VTOL configuration to a winged flight configuration. The at least one deployable wing may be configured to act as a stand for the VTOL device when in its stowed position.

The VTOL flying machine may further comprise a payload bay located to a downstream side of the primary drive source.

The VTOL flying machine may further comprise a rudder and/or vertical stabilizer. This feature may be configured to facilitate the flight transition from hovering to winged flight and to direct and/or stabilize the VTOL device during winged flight. The rudder and/or the vertical stabilizer may be configured to act as a stand for the VTOL device.

When in a winged flight configuration, the ducted fan may be arranged to provide forward thrust substantially parallel to a plane of the wings of the machine, and when in a VTOL configuration, the ducted fan may be configured to provide a vertical thrust with the plane of the wings and the primary axis of the device being substantially vertical.

The axis of rotation of the ducted fan may be configured in a fixed orientation relative to a main body of the device and relative to the primary and/or secondary drive source(s), such that transition from vertical hovering flight to winged flight is achieved by rotation of the main body of the device, the primary and/or secondary drive sources and the ducted fan from a vertical arrangement to a horizontal arrangement.

The VTOL flying machine may further comprise a primary energy store located to a downstream side of the primary drive source opposite the ducted fan.

The VTOL flying may further comprise a secondary energy store located to a downstream side of the primary drive source opposite the ducted fan.

BRIEF DESCRIPTION OF THE DRAWINGS

FIGS. 3A to 3D illustrate schematically different flying modes of the device according to embodiments of the invention.

DETAILED DESCRIPTION OF EMBODIMENTS

Figure 1:
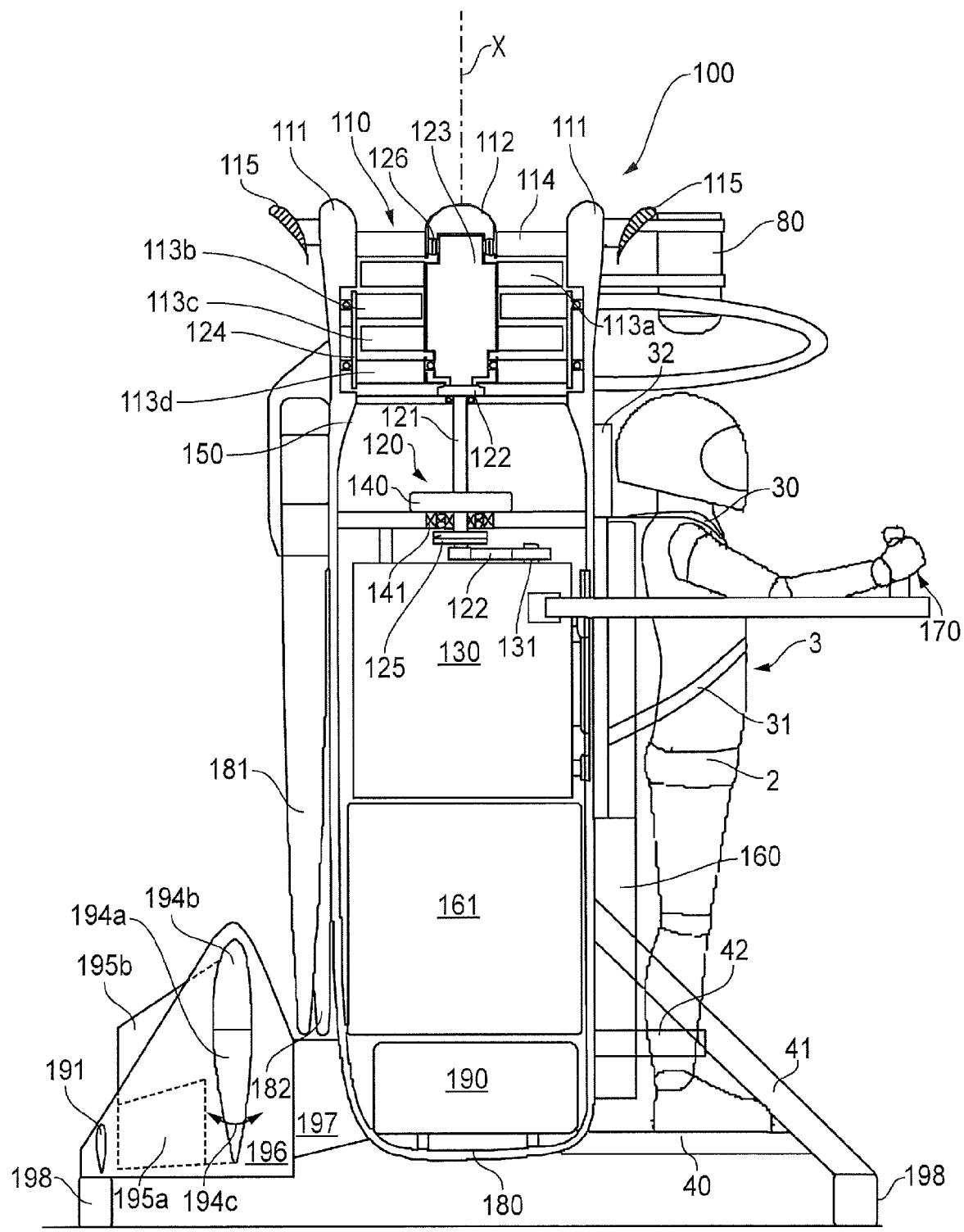
FIG. 1 shows a schematic cross sectional side view of a VTOL device according to embodiments of the invention.

FIG. 1 illustrates a vertical take-off and landing (VTOL) device 100 in accordance with embodiments of the invention. The device 100 is generally sized and configured to carry a human adult user 2 and this load may be supplemented with an additional payload 190. The overall passenger and payload weight carried by the device may therefore be in the region of around 50 to 150 kg. However, in other embodiments the device may be larger or smaller and configured for carrying larger or smaller payloads. Payloads of up to a 150 kg user and a 20 kg payload, or thereabouts are envisaged.

The thrust source for the VTOL device is a fan 110. The fan 110 preferably has a pair of contra-rotating sets of blades 113a and 113b (blade sets). However, in some embodiments a single rotating blade set 113a or 113b can be envisaged. Each blade set is typically mounted to a corresponding rotor. In alternative arrangements, one pair, or two pairs, of contra-rotating blade sets 113a and 113b and 113c and 113d can be included. One or more further pairs of contra-rotating fans (not shown) could also be included.

The fan is a ducted fan and so is surrounded by ducting or cowling 111. The blade set or sets 113a, 113b, 113c, 113d are mounted centrally within the cowling 111 and are rotatable about a central axis X of the main duct 150 and cowling 111. Central axis X may also be considered a primary axis of the overall device along which one or more components may be substantially aligned. The blade sets may be mounted via variable inlet guide vanes 114, which may be replaced or supplemented by other fixed radial mounts.

The set of variable angle guide vanes 114 at an inlet side of the fan 110, may be provided with a structural function for the central dome 112 and to adjust the angle of attack due to the inlet flow distortions of the air impinging on the blades of the first rotor 113a. For the same reasons secondary ducting 115 may be provided to provide a double-ducted fan.

Most axial flow fans are designed for an inlet flow with minimal inlet flow distortion. The double ducted fan concept is proven to be an effective way of dealing with inlet flow distortions occurring near the lip section of any axial flow fan rotor system. An advantage of providing this secondary ducting 115 is that when the device is in a vertical take-off or hovering mode, but beginning to traverse, the secondary ducting 115 can reduce the likelihood of a inlet duct lip stall occurring due to a transverse flow across the top of the cowling 111 hindering the intake of airflow into the fan 110, which could otherwise reduce its ability to generate a downward thrust.

In particular the secondary stationary duct system 115 controls the "inlet lip separation" 111 related momentum deficit at the inlet of the fan rotor occurring at elevated forward flight velocities while hovering. Such separation is typical in hovering since there is a local zone in which there are strong radial velocity components distorting the inlet flow and limiting the controllability and speed during "hovering". A double ducted design can be advantageous also in other scenarios such as with a strong transverse wind which also generates a radial velocity.

Suitable designs can be found in the paper DOUBLE DUCTED FAN (DDF) By Cengiz Camci and Ali Akturk, of the Turbomachinery Aero-heat Transfer Laboratory, Vertical Lift Research Center of Excellence, Department of Aerospace Engineering, The Pennsylvania State University, dated Sep. 3, 2010. In particular the CASE-B short double ducted fan in FIG. 2.4: (a) page 30 is proven to produce the best results in terms of improved mass flow rate passing from the duct (by 40%) and improved thrust force obtained from the ducted fan (by 56.2%) relative to baseline duct in edgewise flight condition. Hence such geometry can be advantageous in embodiments of the present invention.

A central dome or bullet nose 112 may be provided centrally to the fan 110. The blade sets 113a, 113b and/or 113c and 113d (and any others present) are driven by a drive train 120 to deliver drive from a drive source to the fan. Where contra-rotating pairs of blade sets are used, it is necessary to generate contra-rotating drives for the contra-rotating blade sets. This can negate any resulting torque generated by the rotating blade sets and acting on the body of the device, which can improve the stability of the device and ease of control, in particular during changes in fan speed. The use of multiple rotors also allows their diameter to be reduced in comparison to an implementation using a single rotor, without impacting efficiency, which can provide a much more compact design. Furthermore, any inlet flow distortion at the duct inlet will be reduced by the first rotor, so that the second and any further rotors will have a much better inlet flows, allowing improved efficiency. A preferred configuration is with one inner shaft 123 connecting a first rotor or set of rotors 113a and/or 113c and a second, outer, shaft 124 connecting a second rotor or set of rotors 113b and/or 113d. The inner and outer shafts are connected to an epicyclic gear 122 which provides a contra-rotation to them. Further this configuration allows much reduced leakage flow since the clearance of the blades in rotors 113b and 113d is towards the hub and not the duct. In further detail, the counter-rotation with no reduction and equal torque among the blade sets can be achieved by using an epicyclic gear 122 where the sun gear is provided on the main shaft 121, which preferably extends directly from the primary drive source. Preferably, the inner shaft 123 and its blades are driven by the epicyclic carrier shaft, while the outer shaft 124 with its blades are driven by the epicyclic ring shaft. The primary drive shaft 121 can therefore drive one or more sets of blades 113a and 113b and 113c and 113d to generate the necessary thrust for the device. The primary drive shaft 121 can advantageously be supported by at least one radial bearing 141 at its lower end, to react primarily radial loads. At an upper end, at least one axial bearing 126 may support the shaft to react axial loads of the fan impinging on the bearing in reaction to the thrust generated by the fan.

The drive train 120 is driven from one or more drive sources. In certain embodiments, it is advantageous to provide more than one drive source. A first drive source may be a primary drive source 130. In some embodiments this may be an internal combustion engine. The combustion engine may comprise a two stroke engine and it may comprise two cylinders or three cylinders, preferably in line, for high power/weight ratio and optimal use of space, although other configurations and numbers of cylinders can be envisaged for different applications. The primary drive source 130 includes an output shaft 131. The output shaft 131 may be connected to the drive shaft 121 via a clutch device 125. This can allow engagement and disengagement of the primary drive source 130 from the drive train 120. This may be advantageous, in particular in instances where the primary drive 130 has failed and it is desired to disconnect it from the drive train 120 in order to allow drive to be provided from a secondary drive source 140. Drive source 140 may be mounted through-shaft with the drive shaft 121 to save any transmission weight (if no reduction is necessary). If a gear train, gear box or transmission is present between an output of the primary or secondary drive source and the fan 110, numerous types can be used. Suitable transmission types include a constantly variable transmission (CVT), a fixed reduction gear, epicyclic gear box, or in some examples it may be beneficial to have a gearbox with one or more selectable speeds or transmission ratios.

The clutch 125 also has the advantage of allowing the drive source 130 to run without providing any drive to the fan 110, if desired. This may be advantageous when running the engine on the ground prior to take-off or after landing. However, as mentioned above, a primary advantage may be the disconnection of the engine in the event of its failure in order to allow a drive to be provided from the secondary drive source 140.

Other emergency mechanisms can be provided. One example is a ballistic parachute 80, which can be fired to provide rapid deployment of a parachute in the event of high altitude failure of a drive source. However, as mentioned above, a drawback of such parachute mechanisms is that below altitudes of around 150 m, the parachute does not have time to deploy and to provide an effective means of breaking the fall of the device, and its user if present, before impact with the ground. Therefore, particularly below altitudes of around 150 m, it may be advantageous to have available a secondary drive source 140 which can be activated in the event of a failure of the primary drive source 130. A drawback of primary drive sources such as combustion engines, is that they are noisy, in particular during take-off and landing. For this reason, it is also possible to use an alternative drive source such as secondary drive source 140, during take-off and/or landing. In this manner, where the secondary drive source 140 is an electric motor, for example, it can provide a quieter power source for take-off, and then the primary drive source 130, which maybe a more noisy combustion engine, can be engaged for higher altitude travel of the device 100. The primary drive source 130 may be delivered energy from a primary energy store 160. In some examples this may be a fuel tank 160, providing a combustible fuel to a combustion engine 130. The device may comprise a main frame, casing or body 180. The fuel tank 160 or other primary energy store may preferably be located outside of the main frame, casing or body 180 of the device, so that it is located far from hot parts of the device, such as the primary drive source, in particular exhaust manifolds if the primary drive source is an engine. Locating the energy store or sources outside the frame can also allow for easier packaging of more critical components such as the drive source and/or payload and/or electronic control equipment, or electrical components such as a secondary energy store, which can in some examples be a battery and/or supercapacitor. A supercapacitor is a term understood by one skilled in electrical power storage systems with much higher charge and discharge rates than batteries and is typically double layered and carbon-based. A supercapacitor has significantly more capacity and more energy storage capability than a standard capacitor. The secondary drive source 140 may be an electric motor and may be powered from a secondary energy store 161, which may be a store of electrical energy, such as a battery and/or a supercapacitor. Providing primary and secondary drive sources and energy stores which are each of sufficient size and capacity for sustained flight of the device would be likely to result in an excessively heavy and cumbersome device. Therefore, it can be advantageous if the second energy store is configured for significantly shortened operation as compared to the primary drive source.

In this way, the secondary drive source can be used only for emergency landings in the event of a failure of the primary drive source. Additionally or alternatively, the secondary drive source can be used for reduced noise landing and take-off. In either the emergency case, or the reduced noise case, an operating time of between fifteen and seventy five seconds would be sufficient for the secondary drive source. Therefore, the secondary energy store 161 can be sized and configured to provide sufficient energy for that length of operation. In addition to such uses, the secondary drive source can be used to provide an additional boost to the power delivered by the primary drive source. This can allow the primary drive source to work at a reduced power level. This can enhance the TBO and fuel efficiency of the primary drive source.

A suitable motor preferably has the following performance characteristics, which can include, continuous power output of up to 150 kW, continuous torque of around 250 Nm. Weight is preferably less than around 40 kg. A relatively low speed of the motor can remove the need for a gearbox, so operating speeds of at or below around 6000-4000 rpm are beneficial for use in devices disclosed herein. Avoiding a transmission gearbox can make a 20 kg weight saving, which is significant in devices of this scale.

As for the battery/supercapacitor, the requirement is for a very high energy density and very high discharge rates. State of the art batteries can provide around 35C discharge rate and 140 Wh/kg energy density which for a device of the scale illustrated in the specific example shown, results in around 30 kg of battery weight.

One aspect of the configuration of the primary and secondary drive sources which can be important to the overall efficiency of the device is the relative sizing of the primary and secondary drive sources and the capacity of the primary and secondary energy stores. Each drive source is preferably of sufficient size to provide sufficient thrust to fly the device independently of the other drive source. In practice, the secondary drive source may be used for a far lesser proportion of the operating cycle of the device than the primary drive source, such as is described in relation to silent take-off and landing. Given that the secondary drive source is only preferably intended for emergency use or take-off and landing use, it may be provided with a secondary energy store which is smaller than the primary energy store. This results in an energy capacity of the secondary energy store of around between 2% to 3% of the energy capacity of the primary energy store. Such optimized energy capacity is key for a practical and commercial application of compact personal flying machines.

In some examples, the primary energy store is sized and configured to store a value X of energy, while the secondary energy store is sized and configured to store a value of between around 0.02X and 0.03X of energy. The first or second energy stores may be either or any of: a fuel tank, a canister, a battery, a battery cell, a kinetic energy storage device, a capacitor or a supercapacitor. In some examples, the primary energy store is a fuel tank for carrying a combustible fuel for an engine. In some examples, the secondary energy store is a store of energy for electrical output to a motor, such as a battery and/or a capacitor. In some examples the secondary energy store is a kinetic energy storage device.

Advantageously, the secondary energy store may be recharged by operation of the primary drive source 130, either during powered flight by the primary drive source 130, or by running the primary drive source 130 on the ground prior to take-off.

An alternative example of a secondary energy store which may be used in a device is a kinetic energy storage device. Such devices generally comprise a high speed flywheel, which is spun up to speed in order to store kinetic energy, and then when that kinetic energy is required for use, the flywheel is mechanically connected to an output of the device, commonly a rotatable output shaft, to provide kinetic energy. Therefore, the secondary drive source 140 may be a kinetic energy storage device and it may be used in the manner described above for the different flight modes of the device 100, in place of an electrical secondary drive source. Such a kinetic energy storage system can have an advantage over electrical systems, since the overall weight of the kinetic energy storage and recovery system can be lower than an electrical system, which requires electromagnetic devices and electric energy storage devices, such as motors, magnets, batteries and/or supercapacitors.

The device may also be provided with either fixed or deployable wings 181/182 which are configured to permit substantially horizontal winged flight of the device. This can provide increased lift so that the fan 110 can be used primarily for forward thrust, with lift being provided by the one or more wings 181/182. This is described in more detail in connection with the following figures.

The user 2 can be attached to the device via a harness 3 which may comprise upper 30 and lower 31 straps to retain the user to a user position 32. Padding may be provided between the user 2 and the device to reduce the transmission of vibration to the user during operation. The user 2 may be allowed to stand on a platform 40 and a stand 41 may help to retain the device in an upright position when on the ground. One or more dampers 198 and 198 can be provided to help to absorb shocks upon landing, in particular in the case of harsh landings. A leg strap 42 may also be provided to restrain the legs of the user during use.

In addition to wings 181 and 182, elevators 191 and 194a provide extra lift and a rudder 195a and/or fin 195b may be provided to assist with stability during winged flight and/or steerage during winged flight. The structure comprising the elevators 191 and 194, the rudder 195b and the connecting plates 196/199 and 197 may also provide a double function as a part of a stand on which the device can stand when in its upright position on the ground.

Figure 2:
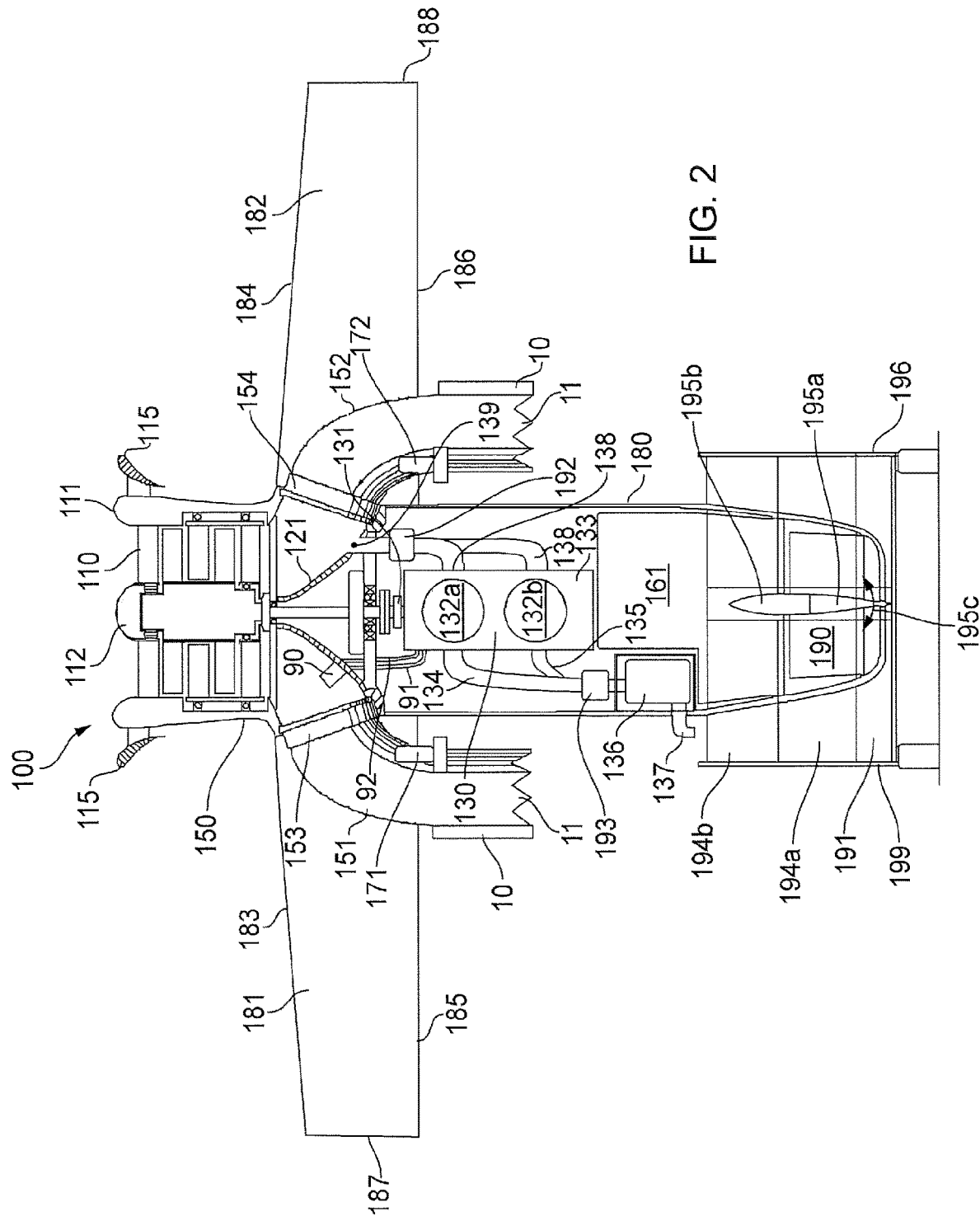
FIG. 2 shows a cross sectional rear view of the device of FIG. 1.

Connecting plate 196 is mounted at or toward a far end of the fixed stabiliser 194b, to which the movable elevator section 194a is attached, such that the movable section 194a can pivot as shown by arrow 194c. A second connecting plate 199 is mounted at or toward an opposite end of the horizontal stabilizer, as can be seen in FIG. 2. A vertical stabiliser has a fixed section 195b and a movable section 195a which can act as a rudder by pivoting as indicated by arrow 195c.

FIG. 2 illustrates a cross-sectional front view of the device with the wings 181 and 182 in a deployed position. As can be seen in the Figure, the primary ducting 150 splits into first and second exhaust ducts 151 and 152. The exhaust ducts 151 and 152 may be rotatable around rotatable mounts 153 and 154 to allow steerage of the device during flight, by directing thrust from the separate exhaust ducts. The rotatable mounts 153 and 154 may be universal joints to allow adjustment of the orientation of the exhaust ducts in substantially any direction relative to the fan 110. The flow from the fan 110 is therefore split into a plurality of exhaust ducts to provide a plurality of directable thrust sources. The exhaust ducts may be provided with a chevron form 11, which can reduce noise generated. One example of a primary drive source 130 is illustrated in the form of a two cylinder engine having an engine block 133 and first and second pistons 132a and 132b. The engine is provided with an air inlet 139 which feeds air into the inlet port 138 of the engine. The inlet 139 can be provided in one or more of the primary duct 150 or the first and/or second exhaust ducts 151 and 152 of the fan arrangement. Another component which can be located in the ducts and more generally in the thrust path of the fan is a cooling device 90 for the engine 130. Cooling fluid may be delivered to and from the cooling device 90 by fluid conduits 91 and 92 in order to cool the engine. One or more exhaust outlets 134 and 135 may be provided to deliver exhaust gases to a muffler 136 and on to an exhaust pipe 137. The engine may be provided with an electric turbocharger and/or an electric supercharger to provide additional boost to the engine. An electric turbo charger can take thrust from the exhaust of the engine and use a turbine 193 and suitably connected generator to convert this to electrical power to be delivered to the battery. An electric supercharger can take electric power from the battery and convert it to mechanical output with a motor, for providing power to the compressor 192. In some arrangements it is possible for the electric compressor 192 to take power from the generator/turbine 193 directly.

It is also possible to provide a further additional thrust device to the VTOL device 100. This can be provided in the form of one or more secondary thrust sources 10 which may be provided anywhere on the device in order to aim their thrust in a generally downward direction during flight. In the illustrated example, they are located on the first and second exhaust ducts 151 and 152. The devices 10 can be provided in the form of emergency rockets, for example solid state rockets. These may be fired in the event of the failure of one or more of the primary and secondary drive sources 130 and 140. Therefore, it is possible to provide the device with one or more back-up drive sources to provide drive to the fan or alternative thrust sources to provide an alternative or back-up in the event of failure of the primary drive source, or simply as an alternative thrust source to the fan 110. The thrust available in the secondary thrust devices is preferably sufficient to allow safe descent of the device in the event of engine failure. This can be calculated depending on the weight of the device and its payload and the desired permissible downward speed and/or downward acceleration.

FIG. 2 also illustrates the wings 181 and 182 of the device in a deployed position. Although they may be deployable between the position shown in FIG. 2 and the stowed position of FIG. 1, where they are substantially aligned with the primary axis X of the device, the wings may be provided in a fixed and permanent configuration as illustrated in FIG. 2. As can be seen, each wing has a leading edge 183, 184, and a trailing edge 185, 186 and a tip 187, 188. As will be appreciated, when the device is propelled in a forward direction, i.e. that of the leading edges 183 and 184, the wing can be suitably configured to provide lift to the device and so the device can be flown in winged flight. Using the drive or thrust sources to provide forward thrust to the winged device during extended flight can result in overall efficiency increases and therefore extended range of the VTOL device during use, since the "hovering" mode flight is significantly less efficient than winged flight.

Referring to both to FIGS. 1 and 2, the control of the device by the user will now be briefly described. The user 2 can grasp manual control inputs 170. Manual control inputs 170 can be directly connected to the exhaust ducts 151 and 152 to effect direct mechanical control. However, other forms of control input can be envisaged. Any suitable interface to receive user inputs, either by remote control or by on-board control of the device can be envisaged to provide control inputs to the device 100. The main controls are the level of thrust generated by the fan 110, angles of each of the exhaust ducts 151 and 152, deployment or stowage of the wings 181, 182 and the selection of a drive or thrust source from the primary or secondary drive sources or thrusters 10. In the illustrated example, manual input devices 171 and 172 are illustrated and can be gripped by the user's hands. The user can provide input to set a direction of thrust of the exhaust vents 151 and 152 to control and steer the device in flight. This generally controls the rotation of the exhaust ducts around their rotatable connections 153 and 154. Other inputs, either visual, verbal or mental could be envisaged by other input devices, such as voice recognition commands interpreted by a suitable controller, touch screen input, movement sensors or any other form of input device which can deliver control signals from a user to a controller. Many are in development, including mind control based upon detecting brain waves, and could be implemented to control flight of the device. Similarly, one or more input devices can be provided to receive a thrust level input from a user to control the level of thrust required to drive the device. Alternatively, the user may simply input coordinates of a destination and a controller may be provided which calculates a vertical and horizontal trajectory and then controls the device automatically to achieve a suitable altitude, transition to winged flight if necessary, and then transition to vertical flight once more for landing at the chosen destination. As will be appreciated, in such instances, the user 2 may simply be a passenger and may not have any control over the device 100, or may simply have emergency control in the event of anything going wrong with the automated flight systems. Inputs may be provided to allow the user to select one of the primary and/or secondary drive sources for the fan 110. However, the selection of those drive sources may alternatively be automatically carried out by a controller provided either in the device 100, or remotely from the device in an automated or manual controller which simply transmits control signals to the device. Similarly, activation of the emergency thrusters 10 may be manually controlled or automatically controlled from a remotely or locally located controller.

FIGS. 3A to 3D illustrate some possible modes of operation of the device 100. The sequence of figures generally illustrates how the device can be used from take-off through to winged flight. In FIG. 3A, the device 100 is operated with the exhaust ducts 151 directed in a generally downward position and aligned with the primary axis X of the device 100. The user 2 can increase the thrust until such time as sufficient lift is provided to lift the user and device from the ground. Varying proportions of power can be provided from the primary and secondary drive sources. Take-off can be 100% from the primary power source, but this can be noisy. It can therefore be preferred to have a proportion, of between around 30% to around 70% or more of the drive power coming from the secondary drive source, while a remainder comes from the primary drive source. This balance can then be shifted toward a greater proportion of the power coming from the primary drive source as the device gains height, and/or gains speed after lift-off.

Effecting take-off and landing with, for example 50%-60% power using an electric generator allows the combustion engine to be run at only 50%-40% power at these times. This can allow a much lower net fuel consumption as the engine can be run in its more efficient revolutionary speed range. The device can be configured to enable recharging of secondary energy store, such as a battery, slowly with the engine during horizontal flight at around 50% power as well, making the charging possible at the most efficient engine speed as well. Also, the engine not running at 100% improves greatly the TBO, since the stress effect on the engine is not linear with the engine power but goes almost with the square of it, thus significantly increasing the need for more regular maintenance.

In order to transition to winged flight, as shown in FIG. 3D, the user can control the exhaust ducts 151 and 152 to begin to propel the user 2 and the device 100 in a forward direction as in FIG. 3B, preferably with the wings still closed. As forward speed increases, first drag and then lift in the direction of arrow 300 generated by the elevators 191 and 194 will increase providing angular momentum for the rotation of the machine from the hovering flying mode to the winged flying mode. The deployable wings 181 and 182 can be gradually opened as forward motion and angular rotation increases, as shown in FIG. 3C, until the device arrives at the fully winged flying mode depicted in FIG. 3D. Depending on the weight distribution and the detailed position of the wings, the deployable wings could be opened in the hovering condition, prior to transition to winged flight.

To increase the forward speed, the user can push the ducts toward the rear of the device, as shown in FIGS. 3B, 3C & 3D, and as increasing forward speed increases lift generated by the wing or wings 181 and elevators 194, then the exhaust nozzles 151 and 152 can be increasingly orientated towards the front-to-rear axis of the device and then aligned to the device in the horizontal winged flight mode, to further increase the forward speed and generate further lift as necessary from the wing or wings 181. This efficient winged flight can be used for the majority of a journey between locations to provide increased range. During winged flight, control surfaces on any or all of the wings, tail or tailfin may be used to control the flight of the device. In some examples, the main wings 187 and 188 may have no control surfaces and may be substantially fixed. Control surfaces may be provided on elevators 194 and a rudder 195 of the device and/or on a tail wing or wings provided additionally to the main wings 187 and 188. Any or all of the control surfaces may be operated by a user via control pedals, which may be provided in the structure 40. The pedals may be provided in the structure 40 on which the user stands in the upright position of the device.

As will be appreciated on understanding the steps carried out in FIGS. 3A to 3D, the return to vertical flight for a vertical landing is essentially the reverse of the sequence shown in FIGS. 3A to 3D. The user or controller directs the device into a vertical orientation by pointing the head or front end of the device upward with a gradual downward orientation of the exhaust ducts 151 and 152. Once vertically oriented to a sufficient degree that the weight of the device is entirely balanced by the thrust of the fan 110, the user or controller can begin to reduce the thrust to effect a descent.

A further measure which can be incorporated into the emergency features of the device is the detachment of one or more components of the device in the event of a power failure, in order to slow the descent of the device. If one or the other of the drive sources fails, one or more components of the drive source or its energy store may be jettisoned, such as the drive source itself, components of the drive source, or the corresponding energy store. In some examples, where there is a failure in the primary drive source, one or more of the primary drive source, its corresponding primary energy store, and/or a payload carried by the device may be jettisoned to slow a descent of the device in such a failure mode.

Although particular arrangements have been discussed and described in relation to the enclosed figures, it will be appreciated that the various features can be combined in different combinations from those described above whilst still realising the benefits of the invention.

The invention claimed is:

1. A vertical take-off and landing (VTOL) flying machine, comprising:
   a ducted fan for providing thrust for flight, take-off and landing, the ducted fan having an intake side and an outlet side and comprising at least two co-axial rotors configured to contra-rotate about a fan axis X when driven in rotation;

a primary drive source configured to drive the ducted fan in rotation, the primary drive source being arranged in line with the ducted fan and to the outlet side of the ducted fan;

a secondary drive source configured to provide a secondary drive to the ducted fan;

first and second thrust air ducts configured to split thrust from the ducted fan into a pair of thrust streams and to guide the two respective thrust streams to opposite respective sides of the primary drive source; and a gearbox located between the ducted fan and at least one of the primary drive source and the secondary drive source, the gearbox configured to provide contra-rotating output drives for the contra-rotating rotors of the ducted fan, from an output of the primary drive source and/or from an output of the secondary drive source;

wherein the first and second thrust air ducts are rotatable relative to a main body of the VTOL flying machine and the axis of rotation of the ducted fan to direct thrust to control motion of the VTOL flying machine; and wherein the VTOL flying machine is sized and configured to have a weight carrying capacity suitable for and limited to carrying a single human adult user and payload together totaling no more than 170 kg.

2. The VTOL flying machine according to claim 1, further comprising one or more variable inlet guide vanes located at an inlet side of the ducted fan.

3. The VTOL flying machine according to claim 1, wherein the secondary drive source is provided with energy from a secondary energy store.

4. The VTOL flying machine according to claim 3, wherein the secondary energy store is configured to receive and store energy from the primary drive source.

5. The VTOL flying machine according to claim 3, wherein the secondary drive source and its secondary energy store are sized and configured to provide between 40 seconds and seven minutes, or between 75 seconds and 5 minutes, or between 100 seconds and 4 minutes, of powered hovering flight to the VTOL flying machine in the absence of power from the primary drive source.

6. The VTOL flying machine according to claim 3, wherein the secondary drive source is an electrical machine and the secondary energy store is an electrical energy storage device.

7. The VTOL flying machine according to claim 6, wherein the electrical energy storage device is a battery or a capacitor-based electrical storage device.

8. The VTOL flying machine according to claim 1, wherein the primary drive source is connected to the ducted fan via a selectively engageable drive transfer means configured to selectively transfer or isolate drive from the primary drive source to the ducted fan.

9. The VTOL flying machine according to claim 8, wherein the secondary drive source is configured to be operable both independently of the primary drive source to drive the ducted fan, and in combination with the primary drive source to provide drive to the ducted fan from both primary and secondary drive sources.

10. The VTOL flying machine according to claim 8, further comprising a secondary thrust source independent of the ducted fan, the secondary thrust source being operable to provide powered hovering flight to the VTOL flying machine in the absence of thrust being provided by the ducted fan.

11. The VTOL flying machine according to claim 1, comprising a primary energy store for providing energy to the primary drive source, and a secondary energy store for providing energy to the secondary drive source.

12. The VTOL flying machine according to claim 11, wherein the primary drive source is an internal combustion engine and the primary energy store is a source of combustion fuel.

13. The VTOL flying machine according to claim 11, wherein the primary drive source is an electrical machine and wherein the primary energy store is an electrical energy storage device.

14. The VTOL flying machine according to claim 13, wherein the primary energy store is a battery and/or a capacitor-based electrical storage device.

15. The VTOL flying machine according to claim 11, wherein the secondary energy store is configured to have a deliverable energy storage capacity of between 1% to 12%, or between 2% to 10% or 3% to 8%, of the energy storage capacity of the primary energy store.

16. The VTOL flying machine according to claim 1, wherein the secondary drive source comprises a kinetic energy storage device, configured to store kinetic energy delivered to it from the primary drive source, and to deliver the stored kinetic energy to the ducted fan upon demand.

17. The VTOL flying machine according to claim 1, wherein the VTOL flying machine is configured to be operable to conduct an emergency landing using the secondary drive source in the event of a failure of the primary drive source.

18. The VTOL flying machine according to claim 1, wherein the weight carrying capacity which the VTOL flying machine is sized and configured to have is: suitable for and limited to carrying a single human adult user and payload together totaling no more than 150 kg.

19. The VTOL flying machine according to claim 1, wherein the weight carrying capacity which the VTOL flying machine is sized and configured to have is: suitable for and limited to carrying a single human adult user and payload together totaling about 50 to 150 kg.

20. The VTOL flying machine according to claim 1, wherein the secondary drive source is sized and configured to provide a continuous power output of no more than 150 kW.

21. The VTOL flying machine according to claim 1, wherein the secondary drive source weighs no more than 40 kg.

22. The VTOL flying machine according to claim 1, wherein the secondary drive source weighs no more than 30 kg.

23. The VTOL flying machine according to claim 1, further comprising at least one deployable wing configured to be moved from a stowed position to a deployed position to allow the VTOL flying machine to transition from a VTOL configuration to a winged flight configuration.

24. The VTOL flying machine according to claim 23, wherein the deployable wing comprises a pair of rigid wings movable from the stowed position into a deployed rigid wing configuration and the VTOL flying machine is configured to fly under power from the ducted fan in the deployed rigid wing configuration.

* * * * *